United States Patent [19]
Eastwood

[11] Patent Number: 6,109,492
[45] Date of Patent: Aug. 29, 2000

[54] KEYCHAIN TRAY

[76] Inventor: Karen M. Eastwood, 196 Triumph Dr., Atlanta, Ga. 30327

[21] Appl. No.: 09/386,630

[22] Filed: Aug. 31, 1999

[51] Int. Cl.⁷ .............................. B60R 7/04; B60R 11/00
[52] U.S. Cl. ......................... 224/276; 224/572; 224/564; 108/44; 70/456 R
[58] Field of Search ................... 224/276, 564, 224/565, 572, 420; 70/456 R, 456 B; 108/44

[56] References Cited

U.S. PATENT DOCUMENTS

| | | | |
|---|---|---|---|
| 1,618,227 | 2/1927 | Rogers | 224/276 |
| 1,865,241 | 6/1932 | Dock | 224/276 X |
| 2,491,009 | 12/1949 | Lawrence | 224/276 X |
| 2,862,328 | 12/1958 | Wadsworth . | |
| 2,918,202 | 12/1959 | Constantine et al. | 224/276 |
| 3,193,232 | 3/1999 | Hatcher | 224/420 X |
| 4,174,669 | 11/1979 | Lalonde . | |
| 4,762,258 | 8/1988 | Murphy . | |
| 5,489,121 | 2/1996 | Mohr . | |
| 5,558,026 | 9/1996 | Seibert . | |
| 5,749,305 | 5/1998 | Jacovelli . | |
| 5,884,514 | 3/1999 | Willis | 70/456 B X |

FOREIGN PATENT DOCUMENTS

| | | | |
|---|---|---|---|
| 1092483 | 10/1953 | France | 224/276 |

*Primary Examiner*—Gregory M. Vidovich
*Attorney, Agent, or Firm*—Kenneth L. Tolar

[57] ABSTRACT

A tray assembly for supporting a bundle of keys dangling from a vehicle ignition switch includes a substantially planar tray member having a pair of side walls vertically extending from its upper surface. The top edge of each side wall includes an arcuate indention configured to interengage a lower portion of the vehicle steering column. A separable strap is mounted to each side wall immediately beneath the indention for securing the tray member to the steering column. When mounted, a portion of the tray member is immediately beneath the ignition switch allowing the keys to rest thereon to minimize damage to the ignition switch.

4 Claims, 2 Drawing Sheets

KEYCHAIN TRAY

BACKGROUND OF THE INVENTION

The present invention relates to a tray which may be conveniently strapped to a vehicle steering column to support a keychain dangling from the ignition.

DESCRIPTION OF THE PRIOR ART

Vehicle drivers typically carry a keychain having numerous keys mounted thereon. When the vehicle ignition key is placed into the ignition, the weight of the remaining keys dangling from the keychain exerts a tremendous amount of force on the ignition switch. The repeated application of such force can damage the ignition switch sometimes leading to a costly replacement. The present invention relates to a tray which may be quickly and conveniently mounted to the steering column on which a key bundle rests to minimize damage to the ignition switch. Although various vehicle trays exist in the prior art, the trays are designed to retain accessory items such as notepads, beverages and similar articles. None of the prior art devices are designed to support a bundle of keys to protect the ignition according to the present invention. For example, U.S. Pat. No. 5,749,305 issued to Jacovelli relates to a tray that may be attached to a vehicle steering wheel. The tray is designed to function as a desk top and may hold a food and/or beverage. The tray includes an elongated opening that receives a portion of the steering wheel and is secured thereto with a pivoting clip.

U.S. Pat. No. 5,558,026 issued to Seibert relates to a motor vehicle tray that may be attached to a vehicle steering wheel for supporting food and beverages.

U.S. Pat. No. 5,489,121 issued to Mohr relates to a device for securing looseleaf pages on a golf cart steering column.

U.S. Pat. No. 4,762,258 issued to Murphy relates to a universal support device for a vehicle that may be secured to the vehicle windshield.

U.S. Pat. No. 4,174,699 issued to Lalonde relates to a vehicle tray and mounting bracket assembly. The mounting bracket assembly may be mounted over the dash or adapted to be mounted on the floor of an automobile.

U.S. Pat. No. 2,862,328 issued to Wadsworth relates to an adjustable vehicle desk.

As indicated above, none of the above prior art vehicle trays are specifically designed to be mounted to a vehicle steering column for supporting a bundle of keys dangling from the ignition according to the present invention.

SUMMARY OF THE INVENTION

The present invention relates to a tray member for supporting a bundle of keys dangling from an ignition switch. The device comprises a substantially planar tray member having a pair of opposing side walls vertically extending from its upper surface. The top edge of each side wall includes an arcuate indention configured to interengage the vehicle steering column. A separable strap having hook and loop fasteners thereon is mounted to each sidewall for securing the tray member to the steering column. A portion of the tray extends outwardly from beneath the steering column on which keys dangling from the ignition may rest. In addition, the tray may be formed of extendable sections allowing the tray to be retracted beneath the steering column when not in use. It is therefore an object of the present invention to provide a vehicle tray for conveniently supporting a bundle of keys dangling from a vehicle ignition switch.

It is another object of the present invention to provide a vehicle tray that protects a vehicle's ignition switch.

It is yet another object of the present invention to provide a vehicle tray that may be quickly and conveniently secured to a vehicle steering column. Other objects, features and advantages of the present invention will become readily apparent from the following detailed description of the preferred embodiment when considered with the attached drawings and the appended claims.

DESCRIPTION OF THE PREFERRED EMBODIMENT

Figure 2:
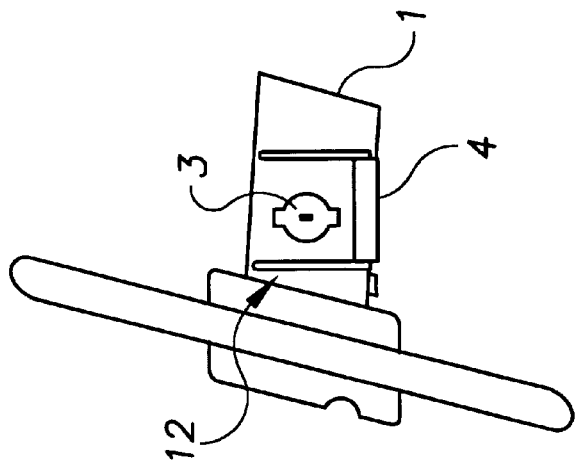
FIG. 2 is a side view of the steering wheel and steering column with the tray secured thereto.
Figure 1:
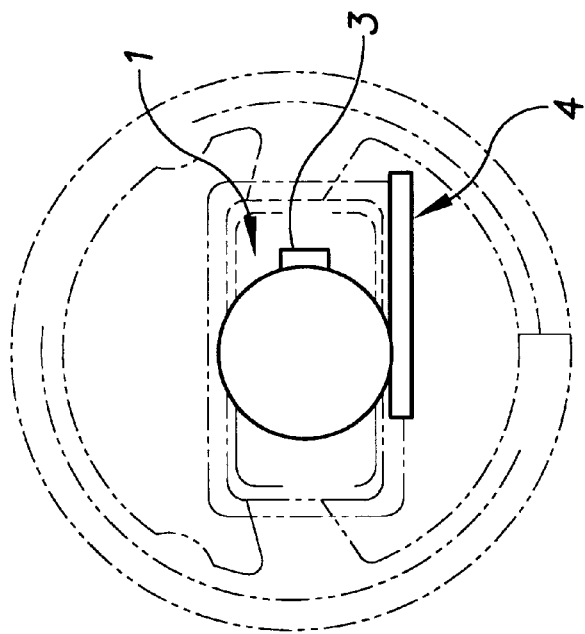
FIG. 1 is a front view of a vehicle steering wheel depicted in phantom with the tray according to the present invention attached to a steering column.
Figure 3:
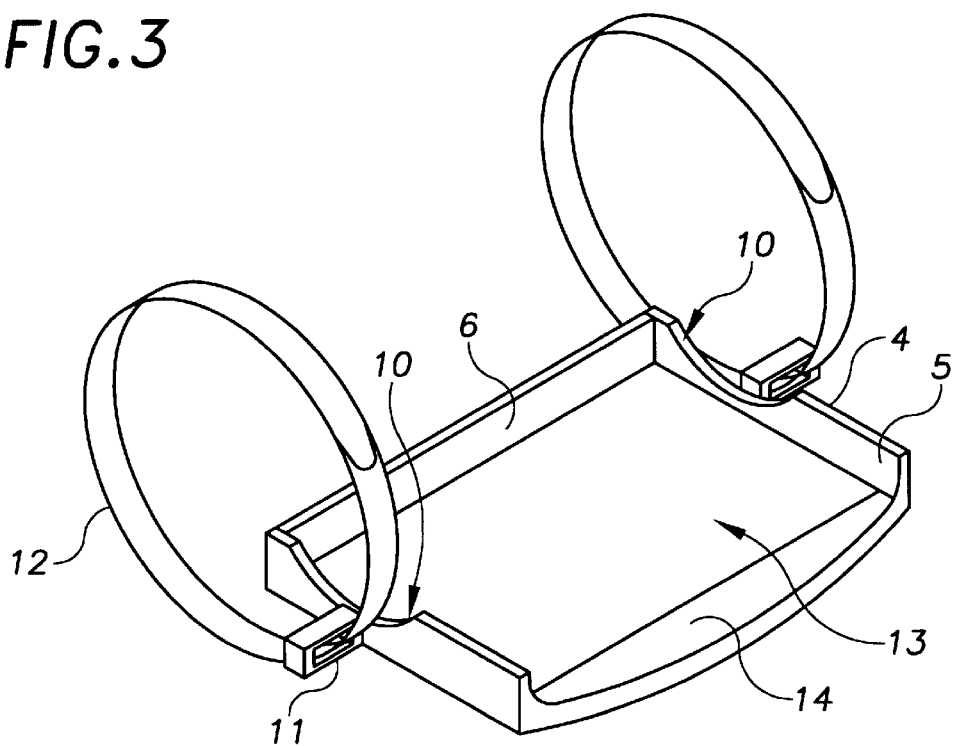
FIG. 3 is a perspective view of the present invention.

Referring now to FIGS. 1 through 3, the present invention relates to a device for supporting a bundle of keys dangling from the vehicle ignition. A vehicle typically includes a steering column 1 with the steering wheel mounted thereon. On an inwardly facing portion of the steering column is an ignition switch 3 that is activated by inserting a key into a receptacle and rotating the key.

The present invention relates to a tray assembly which may be attached to the steering column described above. The device comprises a substantially planar tray member 4 having an upper surface and a lower surface. Vertically extending from the upper surface of the tray member are a pair of opposing side walls 5 with an end wall 6 disposed therebetween. Overlapping the upper surface is a soft layer of felt or a similar material to reduce or eliminate noise when the keys shift on the tray member. The top edge of each side wall includes an arcuate indention 10 dimensioned and configured to interengage the steering column. Mounted to the outwardly facing side of each side wall immediately beneath the arcuate indention is a loop 11 having a separable strap 12 received therein. The separable strap may be adjusted using hook and loop fasteners, or any other conventional fastener means, to form a desired circumference allowing the device to be attached to varying size steering columns. In addition, the straps may be elastomeric so that the tray assembly may be tightly secured to the steering column.

Referring now to FIG. 3, the tray member may be composed of first 13 and second 14 sections allowing the tray to be extended from or retracted beneath the steering column. The two sections may be joined with any conventional means. Accordingly, when the device is not in use, the tray may be unobtrusively stored beneath the steering column.

Figure 4:
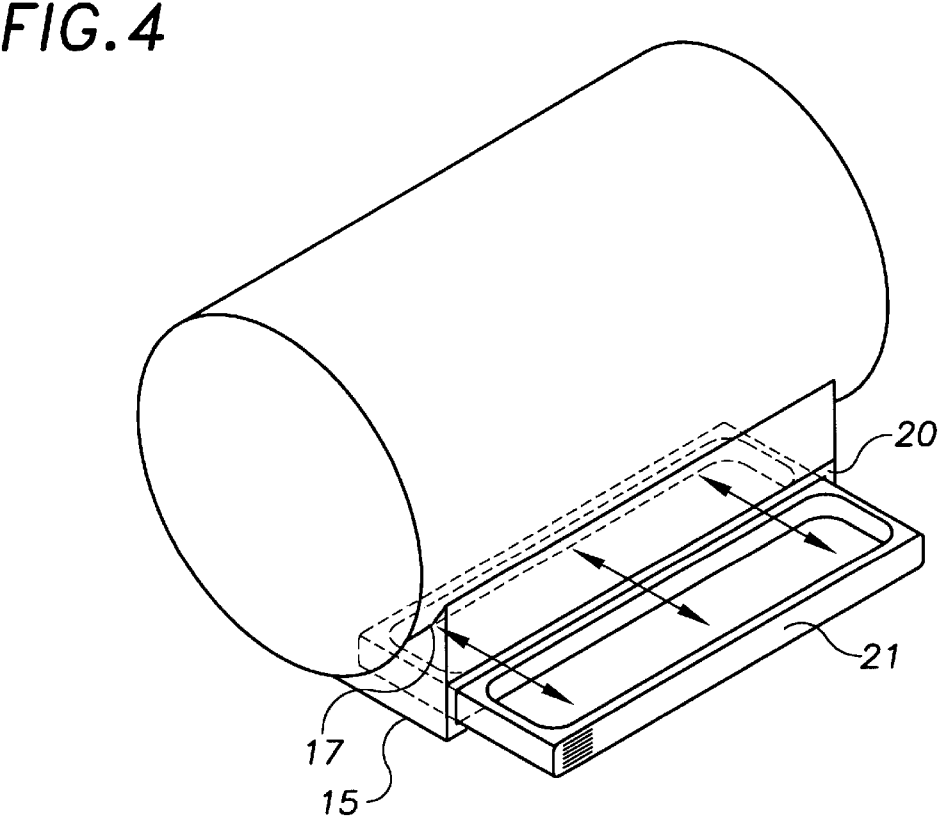
FIG. 4 is an alternative embodiment of a tray attachable to a vehicle steering column.

Referring now to FIG. 4, another embodiment is depicted. It is noted that details of the steering column have been removed for clarity. A base member 15 having an arcuate surface 17 is secured to the steering column with a pair of straps or similar means (not shown). The base member includes a receptacle 20 with a tray member 21 slidably received therein. This embodiment allows the tray member to be concealably and unobtrusively stored when not in use.

To use the above described device, the indentions on the tray member side walls are placed against the lower portion of the steering column. The straps are tightly secured about the steering column such that a portion of the tray member extends outwardly therefrom and immediately beneath the ignition switch. If the retractable version is used, the first section is extended from the second section until the first section is immediately beneath the ignition switch. The tray member is preferably constructed with plastic while the straps are constructed with fabric or rubber. However, as will be readily apparent to those skilled in the art, the size, shape and materials of construction may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a vehicle having a steering column with an ignition switch mounted thereon, a tray assembly for supporting a bundle of keys dangling from said ignition switch, said tray assembly comprising:

a substantially planar tray member having an upper surface for supporting the bundle of keys thereon;

a pair of opposing side walls vertically extending from the upper surface of said tray member, each of said side walls terminating at an upper edge;

an arcuate indention on the upper edge of each of said side walls, each of said indentions configured and dimensioned to interengage said steering column;

means for attaching said tray member to said steering column whereby a portion of said tray member is disposed immediately beneath said ignition switch to support the bundle of keys dangling therefrom.

2. A device according to claim 1 wherein said means for attaching said tray member includes a separable strap mounted to each side wall, each of said straps having an adjustable fastener means thereon for adjustably securing said strap about said steering column.

3. A device according to claim 2 wherein said fastener means is a hook and loop fastener.

4. A device according to claim 1 wherein the upper surface of said tray member includes a soft layer to minimize noise when the bundle of keys are resting thereon.

\* \* \* \* \*